United States Patent [19]

Herry

[11] Patent Number: 5,003,720
[45] Date of Patent: Apr. 2, 1991

[54] FISH LURE

[76] Inventor: Robert E. Henry, 1729 Greer Dr., W., Newark, Ohio 43055

[21] Appl. No.: 455,142

[22] Filed: Dec. 22, 1989

[51] Int. Cl.⁵ .............................................. A01K 85/00
[52] U.S. Cl. .................................................... 43/42.39
[58] Field of Search .................. 43/42.39, 44.95, 43.15

[56] References Cited

U.S. PATENT DOCUMENTS 1,972,697  9/1934  Walsh .................................. 43/42.39
2,989,817  6/1961  Kepler ................................ 43/42.39
3,104,486  9/1963  Gressard ............................. 43/42.39

Primary Examiner—Richard K. Seidel
Assistant Examiner—Chuck Y. Mah

[57] ABSTRACT

The invention relates to an improved fishing lure and sinker arrangement that simulate a realistic movement that makes the lure attractive to fish. The arrangement causes the lure to move sporadically while the line is being reeled in in a manner similar to that of live bait.

4 Claims, 1 Drawing Sheet

FISH LURE

BACKGROUND OF THE INVENTION

1. Field of the Invention

The invention is directed toward the field of fishing and, in particular, fishing lures. Specifically, the invention of the present application provides a lure and sinker arrangement that causes the lure to move in a manner that appears lifelike.

2. Description of the Prior Art

Fishing lures that have sinkers that move are known in the art see e.g. U.S. Pat. Nos. 2,716,833; 3,346,986; 3,568,355; and 3,104,488. A few of these provide sinkers that may be dislodged from the line in case they get snagged, or some other fate befalls the lure and/or sinker. While some of these provide sinkers that are allowed to move along the fishing line, none of them restrict the movement of the sinker to a certain distance in front of the lure, nor do they place the sinker in the particular location that the sinker of the present invention is placed.

SUMMARY OF THE INVENTION

The invention relates to a forward weight fishing lure that has a sliding sinker in conjunction with it. The sinker is on a metal wire extending from the lure or a fishing line and is in a position in front of the lure. The sinker can freely move up to a point a short distance from the lure where it comes in contact with a stop on the line. The stop prevents the sinker from moving any farther forward. The movement of the sinker is back and forth along the fishing line in front of the sinker and it is this movement that imparts a slight hesitation to the lure that causes its movements to appear life-like and improves the chances for fish to strike the lure.

It is the object of this invention to provide a fishing lure that moves through the water in a life-like fashion.

It is another object of the invention to provide a fishing lure that is attractive to fish.

Still another objective is to provide a fishing lure that hesitates in its movements as it is being trolled through the water.

DRAWINGS

DESCRIPTION OF THE PREFERRED EMBODIMENT

Figure 2:
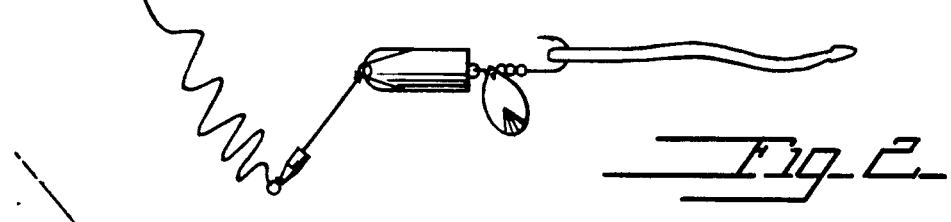
FIG. 2-4 shows the positions of the lure and sinker as it moves through the water.
Figure 3:
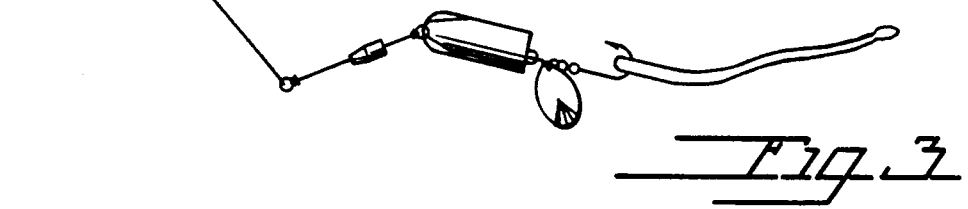
Figure 4:
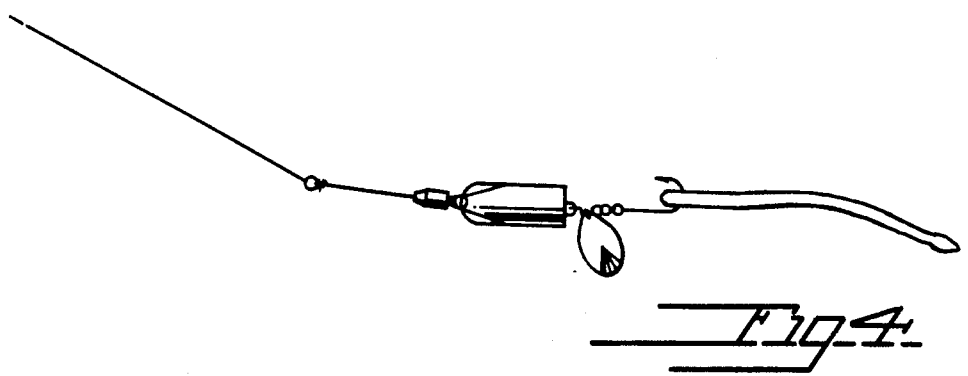

The lure resembles an ordinary fishing lure and has a sinker in the front that can freely move back and forth up to a point in front of the lure. The sinker is strung on a metal wire attached to the lure or on the fishing line, other variations are possible as long as they permit the sinker to move back and forth. The sinker can only move forward a short distance on the line or wire before it comes in contact with a stop on the line. As can be seen in FIGS. 2-4 the lure and metal wire are in pivotal connection to each other (compare the angle the wire makes with the lure in FIG. 2 with that in FIG. 4, from 120 degrees to about 180 degrees). This pivotal connection, which is shown as a loop in the wire in FIG. 1 allows the lure and the metal wire (or connecting means) to pivot in relation to each other to accentuate the hesitation in the movement of the lure. In the preferred mode, this distance is one and one-eighth of an inch but other distances are possible. The stop can be anything attached to the line that prevents the sinker from moving forward. By way of example, the stop can be a split shot or a loop made in the wire that is attached to the front of the lure.

The movement that this arrangement imparts to the lure comes about as follows:

When the lure is casted the sinker is in the forward position at the point farthest from the lure. The sinker takes the lure to the bottom or to the depth that the caster wants it retrieved to. It continues in that position until the retrieval is started. As the lure is in a jigget mode, the sinker will cause the lure to transmit action to the rest of the lure; on a normal retrieve, with conventional lures, the spoon and the blade provide the balance of the action. During this time, the sinker moves back and assumes a position similar to a weight forward lure with the sinker adjacent to the front of the lure. The slightest movement of the rod tip causes the sinker to change position. Typically the movement of the rod tip will create some slack in the line, this will cause the sinker to move forward along the wire see FIG. 2. As the sinker falls forward, this causes the balance of the lure to hesitate thus creating more action to the lure. As the line begins to tighten the sinker will fall back toward the lure again, FIG. 3 until it resumes the position it had originally at the beginning of the retrieval, FIG. 4.

Figure 1:
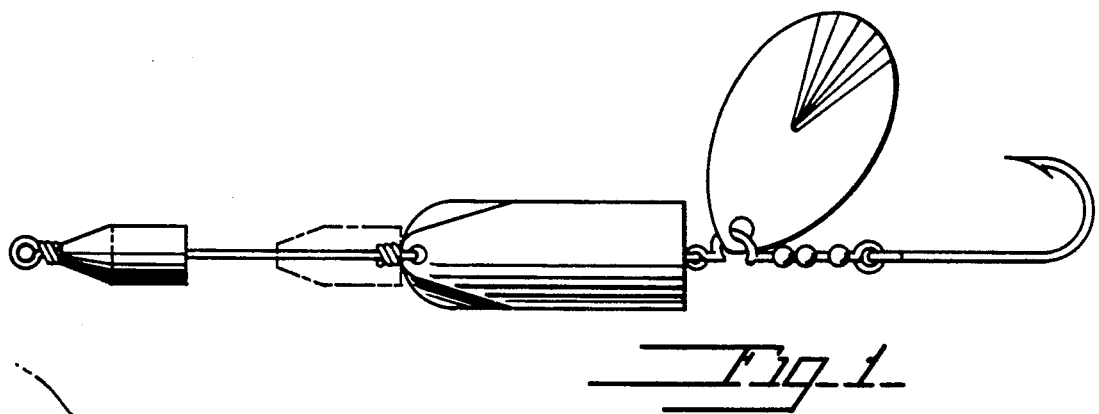
FIG. 1 shows a view of the lure and sinker arrangement.

The pivoting connection allows the metal wire shown in FIG. 1 to pivot downward when the fisherman stops reeling or otherwise pulling on the lure. The weight starts out during the cast in forward position (near the line, see FIG. 2) and makes its way toward the rear (that end nearest the lure) as the line is reeled or pulled on. After the cast, the fisherman alternately tugs (or reels) on the line and then stops, this causes slack in the line.

The wire and lure are in a nearly straight line during the reeling but as the line goes slack these two pivot because of either or both of two reasons: (1) The momentum of the lure and weight together force the wire in front to push to one side because the wire is less hydrodynamic then the lure, gravity eventually pulls the wire downward and the weight follows. (2) The momentum of the weight continues to move forward along the wire when the line slackens, the lure does not because of resistance from the water, the weight then forces the wire down and it moves downward.

In either or both cases, the weight moves forward as the line slackens and this causes the lure to hesitate in the water because some of the momentum of the weight and lure combination is transferred forward during the slackening of the line. Any object being alternately pulled and not pulled through the water will have some hesitation. The transfer of some weight forward increases the hesitation of the lure because some momentum is being transferred in the weight and sent forward along the wire.

The lure can be made of any standard material and may be of any desired shape and color. The sinker, too, can be of any size, material, color or weight. Preferably the material selected for the sinker can be either lead, plastic or brass and the spoon can be made of either brass or plastic. The weight of the lure and sinker are important in getting the proper action on the lure, they must be approximately equal so that the sinker can easily move back and forth without the lure or the sinker overpowering the other and causing the arrangement to be tilted in one direction. Typical lure and sinkers weigh about one quarter of an ounce to half an ounce. Other weights are possible as long as the weights of sinker and lure are approximately equal.

The lure and sinker have been used for Bass and Walleye fishing, with results that suggest the lure is attractive to these types of fish. While the exact mechanism that causes the fish to be attracted to the present invention is not known, it has been theorized that the movement of the lure that results from the arrangement appears life-like. This is the hesitation imparted to the lure as the sinker moves forward.

I claim:

1. An improved fishing lure apparatus for simulating aquatic movement while being retrieved said apparatus comprising: connecting means having front and rear end, said front end of said means having line attaching means, said rear end having pivoting means, fish lure attached to said pivoting connecting means, weight means mounted upon said connecting means, front and rear stop means located at said front and rear of said connecting means so that said stop means limit the movement of said weight means along said connecting means during retrieval of said apparatus.

2. The apparatus of claim 1 wherein said connecting means is a metal wire.

3. The apparatus of claim 2 wherein said weight means is a sinker having a central hole so that said sinker may be attached to said connecting means by placing said metal wire inside said central hole.

4. The apparatus of claim 3 wherein said stop means is a split shot.

* * * * *